June 9, 1959
K. G. F. MOELLER
2,889,695
FLEXIBLE SHAFT COUPLING
Filed Feb. 28, 1958
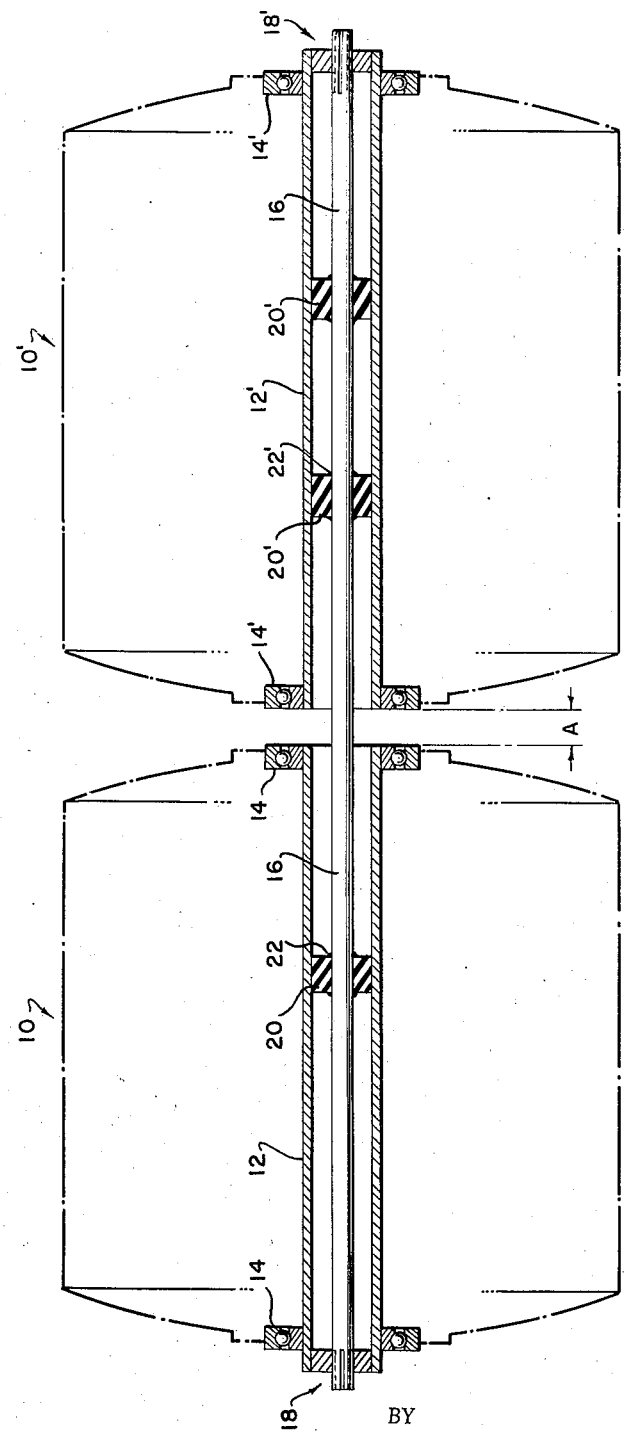
INVENTOR
KURT G. F. MOELLER
BY
*B. L. Zanquill*
ATTORNEYS

United States Patent Office 2,889,695
Patented June 9, 1959

2,889,695

FLEXIBLE SHAFT COUPLING

Kurt G. F. Moeller, Annapolis, Md.

Application February 28, 1958, Serial No. 718,380

1 Claim. (Cl. 64—1)

(Granted under Title 35, U.S. Code (1952), sec. 266)

The invention described herein may be manufactured and used by or for the Government of the United States of America for governmental purposes without the payment of any royalties thereon or therefor.

This invention relates to flexible shaft couplings and particularly to flexible shaft couplings for relatively small and medium size machinery in installations where shock resistance and space are major consideration.

There are numerous flexible couplings well known and on the market which can be attached to conventional shafting. Such prior couplings usually consist of two bushings with flanges attached to the ends of both shafts to be coupled and with the actual flexible coupling mechanism contained between the two flanges. The insertion of such a device requires a space of about 4 to 12 inches between the two machines involved depending upon the size and power rating of the machines. In addition to the space requirement, these prior art couplings represent usually a relatively large mass located on an overhanging part of the shafts and are therefore highly exposed to shock effects.

Accordingly, a general object of this invention is to provide an improved flexible shaft coupling.

Another object of the invention is to provide a flexible coupling that is high in shock resistance.

A further object of the invention is to provide a flexible coupling that is high in vibration suppression.

A further object of the invention is to provide a flexible coupling that is high in noise suppression.

A further object of the invention is to provide a flexible coupling that requires a minimum of space between coupled machinery.

Other objects and the many attendant advantages of the present invention will be made apparent to those skilled in the art by reference to the following detailed description and to the accompanying drawing, in which the single figure illustrates in schematic form a preferred embodiment of a flexible shaft coupling in accordance with the present invention.

Referring now to the drawing, there is shown a driving machine 10 and a driven machine 10', provided with hollow shafts 12 and 12', respectively, which shafts are mounted for rotation in conventional bearings 14 and 14'. For purpose of illustration the driving machine may, for example, be a D.C. motor and the driven machine a generator, pump, blower or the like. Fixedly attached, as at 18, to the left end of hollow shaft 12, as viewed in the drawing, is one end of a relatively long connecting rod 16, made of metal of sufficient rigidity and elasticity for the purpose at hand. The opposite end of rod 16 is slidably attached, as by a quill or spline connector 18', to the right end of hollow shaft 12'.

In order to avoid lateral and torsional vibrations of the relatively long rod 16, and to minimize shock amplitudes, stoppers 20 and 20', of rubber, rubber-like or other suitable material are located along the rod at selected points, preferably the natural antinodical points of the rod. The rubber stoppers may be affixed to either the hollow shafts or to the rod. However, it has been found in practice that by bonding the stoppers only to the rod, as at 22 and 22', larger bearing surfaces and more effective friction damping is obtained between the outer surface of the stoppers and the inner surface of the hollow shafts.

The distance, A, between the machines 10 and 10', which is exaggerated in the drawing for purpose of illustration, can be brought to a minimum required for possible motion under shock. As shown, the mass of the rod 16 is relatively small and any large deflection under shock will be prevented by the rubber stoppers 20 and 20'.

In installations where the amount of angular misalignment between the coupled machines is expected to be very small, it is sufficient to use only one hollow shaft and a coupling rod of about half the length of that shown in the illustrated embodiment. In installations where sound isolation is required, one end or both ends of the coupling rod may be attached to the hollow shaft, or shafts, by means of rubber bushings or mounts.

As pointed out hereinbefore, the coupling according to this invention is space-saving and shockproof and it provides true phase connection of the two shafts since the torsional deflection under a certain load is well known and constant. The principle would be most helpful for ordnance equipment, gun-moving machinery as well as gun directors, computers, torpedo equipment, etc. In other words, in all cases where delicate rotating members in apparatus of high precision are exposed to high shock values, this principle is indicated.

In operation of the illustrated embodiment of the invention, with rotary power applied, by suitable means not shown, to hollow shaft 12 of the driving machine 10, this rotary power is transmitted by coupling 18 to the left-hand end, as viewed in the drawing, of rod 16, and rotary power is taken off of the right-hand end of rod 16 and transferred to hollow shaft 12' by coupling 18', which latter hollow shaft is attached to the rotary portion, not shown, of driven machine 10'. The stoppers 20 and 20', which preferably are located at natural antinodical points along rod 16, substantially eliminate lateral vibration and shock amplitudes of the relatively long rod 16, without interfering with the torsional action of the rod. So as to permit limited longitudinal movement of rod 16 relative to either or both of the hollow shafts, either or both of the connections 18 and 18' may include quill, spline or other sliding connections. Also, as pointed out above, in installations where sound isolation is required, the connections 18 and 18' may include rubber or other sound insulation bushings or mounts.

Thus, it is seen, in accordance with this invention there is provided a relatively simple and inexpensive flexible coupling that is high in shock resistance; high in vibration and noise suppression; and that requires a minimum of space between coupled machinery.

It should be understood, of course, that the foregoing disclosure relates to only a preferred embodiment of the invention and that numerous modifications or alterations may be made therein without departing from the spirit and the scope of the invention as set forth in the appended claim.

What is claimed is:

A flexible shaft coupling for rotatably connecting a pair of axially-aligned hollow shafts, said flexible coupling including a connecting rod concentrically arranged within the hollow shafts and extending throughout the combined length of such shafts, means coupling one end of the connecting rod to a near end of a first of the pair of hollow shafts, means coupling the opposite end of the connecting rod to a remote end of a second of the pair of hollow shafts, a plurality of annular rubber stoppers mounted at selected points along the length of the connecting rod within the hollow shafts, said rubber stoppers being bonded to the connecting rod and in contact with and free to move relative to the hollow shafts, and the said selected points of location of the rubber stoppers being natural antinodical points of the connecting rod.

References Cited in the file of this patent

UNITED STATES PATENTS 2,698,526   Beier _____ Jan. 4, 1955

FOREIGN PATENTS 674,293   Great Britain _____ June 18, 1952
1,123,737   France _____ Mar. 16, 1955